United States Patent
Teng et al.

(10) Patent No.: US 9,666,104 B2
(45) Date of Patent: May 30, 2017

(54) DISPLAY PANEL, DISPLAY METHOD AND DISPLAY DEVICE

(71) Applicant: BOE TECHNOLOGY GROUP CO., LTD., Beijing (CN)

(72) Inventors: Wanpeng Teng, Beijing (CN); Heecheol Kim, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/913,849

(22) PCT Filed: Jul. 30, 2015

(86) PCT No.: PCT/CN2015/085595
§ 371 (c)(1),
(2) Date: Feb. 23, 2016

(87) PCT Pub. No.: WO2016/155170
PCT Pub. Date: Oct. 6, 2016

(65) Prior Publication Data
US 2017/0039901 A1   Feb. 9, 2017

(30) Foreign Application Priority Data

Mar. 31, 2015   (CN) .......................... 2015 1 0149968

(51) Int. Cl.
*G09G 1/14*   (2006.01)
*G09F 9/30*   (2006.01)
(Continued)

(52) U.S. Cl.
CPC .............. *G09F 9/30* (2013.01); *G02B 26/007* (2013.01); *G09G 3/2003* (2013.01);
(Continued)

(58) Field of Classification Search
CPC .. G09G 1/14; G09G 3/36; G09G 3/30; H04N 7/18
(Continued)

(56) References Cited

U.S. PATENT DOCUMENTS

2010/0220096 A1   9/2010   Hyytiainen
2014/0043566 A1   2/2014   Lee et al.

FOREIGN PATENT DOCUMENTS

CN   1845221 A   10/2006
CN   101196620 A   6/2008
(Continued)

OTHER PUBLICATIONS

Written Opinion of the International Searching Authority and International Search Report regarding international application No. PCT/CN2015/085595, filed Jul. 30, 2015.

*Primary Examiner* — Calvin C Ma
(74) *Attorney, Agent, or Firm* — Harness, Dickey & Pierce, P.L.C.

(57) ABSTRACT

The present disclosure provides a display panel including a plurality of pixels, each of which includes at least one sub-pixel. Each sub-pixel includes a color reflection box and a control unit configured to control a color to be displayed by the color reflection box. The control unit is configured to, in the presence of ambient light, control a position of a light-entering surface of a shielding member in the corresponding color reflection box relative to a light-entering surface of a case in accordance with a display image at a corresponding position, so as to enable the color reflection box to display a color of the light-entering surface of the shielding member or a color of a colored material.

20 Claims, 12 Drawing Sheets

(51) Int. Cl.
*G02B 26/00* (2006.01)
*G09G 3/20* (2006.01)
*G09G 3/34* (2006.01)

(52) U.S. Cl.
CPC ......... *G09G 3/2092* (2013.01); *G09G 3/3413* (2013.01); *G09G 2300/0469* (2013.01); *G09G 2330/02* (2013.01)

(58) Field of Classification Search
USPC .................................... 345/1.1, 1.3, 21, 204
See application file for complete search history.

(56) References Cited

FOREIGN PATENT DOCUMENTS

| | | | |
|---|---|---|---|
| CN | 101211519 | A | 7/2008 |
| CN | 102692703 | A | 9/2012 |
| CN | 102707531 | A | 10/2012 |
| CN | 102707532 | A | 10/2012 |
| CN | 104185863 | A | 12/2014 |
| CN | 104715685 | A | 6/2015 |

DISPLAY PANEL, DISPLAY METHOD AND DISPLAY DEVICE

CROSS-REFERENCE TO RELATED APPLICATIONS

This application is the U.S. National Phase of PCT Application No. PCT/CN2015/085595 filed on Jul. 30, 2015, which claims priority to Chinese Patent Application No. 201510149968.5 filed on Mar. 31, 2015, the disclosures of which are incorporated in their entirety by reference herein.

TECHNICAL FIELD

The present disclosure relates to the field of display technology, in particular to a display panel, a display method and a display device.

BACKGROUND

In recent years, along with the rapid development of advertisement industry, various billboards are booming. Especially, the billboards at the side of a highway may be used to intuitively show advertised items and thus have been widely recognized in the advertisement industry.

Usually, there are two ways to show the conventional billboards. In one way, a printed poster is directly pasted onto an advertising wall, and in another way, a display device is hung on the advertising wall. However, for the former, usually the advertising wall at the side of the highway is arranged on a high pillar, and the poster needs to be pasted onto the advertising wall manually, so it is very inconvenient to replace the poster. For the latter, usually an image is directly displayed by a conventional display device by means of a light-emitting source, and thus a very high light intensity of the display device is demanded when it is used to display the poster outdoor during the daytime. Otherwise, in the strong sun shine, it is very difficult for human eyes to clearly view the image, i.e., a visual effect is unsatisfactory.

SUMMARY

An object of the present disclosure is to provide a display panel, a display method and a display device, so as to facilitate the replacement of the poster on the conventional billboard and improve the visual effect of the outdoor billboard during the daytime.

In one aspect, the present disclosure provides in some embodiments a display panel, including a plurality of pixels, wherein each of the pixels includes at least one sub-pixel, each of the at least one sub-pixel includes a color reflection box and a control unit configured to control a color to be displayed by the color reflection box, wherein the color reflection box includes a case defining a cavity, and a colored material and a shielding member sealed within the cavity; a light-entering surface of the case is made of a transparent material, and a light-entering surface of the shielding member is of a predetermined base color; and the control unit is configured to, in a presence of ambient light, control a position of the light-entering surface of the shielding member in the corresponding color reflection box relative to a light-entering surface of the cavity in accordance with a display image at a corresponding position, so as to enable the color reflection box to display the color of the light-entering surface of the shielding member or a color of the colored material.

Alternatively, in the above display panel, when the colored material is shielded by the light-entering surface of the shielding member in a light-entering direction, the color reflection box displays the color of the light-entering surface of the shielding member, and when the light-entering surface of the shielding member is immersed in the colored material, the color reflection box displays the color of the colored material.

Alternatively, in the above display panel, the shielding member includes at least one shielding plate, and the shielding plate is rotatably and fixedly connected at one side to the light-entering surface of the case.

Alternatively, in the above display panel, the shielding plate is connected to the case via a hinge.

Alternatively, in the above display panel, the shielding member is a shielding plate with a light-entering surface parallel to the light-entering surface of the cavity.

Alternatively, in the above display panel, the shielding plate is elastically connected to the light-entering surface of the case by a predetermined region on the light-entering surface of the shielding plate, and the light-entering surface of the shielding plate tightly abuts against the light-entering surface of the cavity in a natural condition.

Alternatively, in the above display panel, the control unit is configured to, when it is determined that the corresponding color reflection box needs to display the color of the light-entering surface of the shielding member in accordance with the display image at the corresponding position, control the light-entering surface of the shielding member in the corresponding color reflection box to abut against the light-entering surface of the cavity, so as to enable the color reflection box to display the color of the light-entering surface of the shielding member; or when it is determined that the corresponding color reflection box needs to display the color of the colored material in accordance with the display image at the corresponding position, control the light-entering surface of the shielding member in the corresponding color reflection box to move away from the light-entering surface of the cavity, so as to enable the color reflection box to display the color of the colored material.

Alternatively, in the above display panel, the shielding plate includes a magnetic material.

Alternatively, in the above display panel, the control unit includes a first electromagnet and a first voltage application unit configured to apply a voltage to the first electromagnet in accordance with the display image at the corresponding position, wherein the first electromagnet is located at a light-entering side of the color reflection box or a side of the color reflection box opposite to the light-entering side; and the first voltage application unit is configured to, when it is determined that the color reflection box needs to display the color of the light-entering surface of the shielding member in accordance with the display image at the corresponding position, apply a first voltage to the first electromagnet, so as to enable the light-entering surface of the shielding member to shield the colored material in the light-entering direction under the control of the first electromagnet; and when it is determined that the color reflection box needs to display the color of the colored material in accordance with the display image at the corresponding position, apply a second voltage to the first electromagnet so as to enable the light-entering surface of the shielding member to be immersed in the colored material under the control of the first electromagnet.

Alternatively, in the above display panel, the control unit includes a second electromagnet, a third electromagnet, a second voltage application unit configured to apply a voltage to the second electromagnet in accordance with the display image at the corresponding position, and a third voltage application unit configured to apply a voltage to the third electromagnet in accordance with the display image at the corresponding position, wherein the second electromagnet is located at the light-entering side of the color reflection box and the third electromagnet is located at the side of the color reflection box opposite to the light-entering side, or the second electromagnet is located at the side of the color reflection box opposite to the light-entering side and the third electromagnet is located at the light-entering side of the color reflection box; the second voltage application unit is configured to, when it is determined that the color reflection box needs to display the color of the light-entering surface of the shielding member in accordance with the display image at the corresponding position, apply a voltage to the second electromagnet so as to enable the shielding member to shield the colored material in the light-entering direction under the control of the second electromagnet; and the third voltage application unit is configured to, when it is determined that the color reflection box needs to display the color of the colored material in accordance with the display image at the corresponding position, apply a voltage to the third electromagnet so as to enable the light-entering surface of the shielding member to be immersed in the colored material under the control of the third electromagnet.

Alternatively, in the above display panel, the colored material is colored ink.

Alternatively, in the above display panel, the color reflection box is of a cuboidal or cubic shape, and the light-entering surface of the cavity of the color reflection box is of a rectangular or square shape.

In another aspect, the present disclosure provides in some embodiments of a display method for the above-mentioned display panel, including steps of: receiving information on the display image; and controlling the position of the light-entering surface of the shielding member in the corresponding color reflection box relative to the light-entering surface of the cavity in accordance with the information on the display image at the corresponding position, so as to enable the color reflection box to display the color of the light-entering surface of the shielding member or the color of the colored material.

In yet another aspect, the present disclosure provides in some embodiments a display device including the above-mentioned display panel.

It is provided the display panel, the display method and the display device in the embodiments of the present disclosure. The display panel includes a plurality of pixels, and each pixel includes at least one sub-pixel. Each sub-pixel includes the color reflection box and the control unit configured to control the color to be displayed by the color reflection box. The color reflection box includes the case defining the cavity, and the color material and the shielding member sealed within the cavity. The light-entering surface of the case is made of a transparent material, and the light-entering surface of the shielding member is of the predetermined base color. The control unit is configured to, in the presence of the ambient light, control the position of the light-entering surface of the shielding member in the corresponding color reflection box relative to the light-entering surface of the case in accordance with the display image at the corresponding position, so as to enable the color reflection box to display the color of the light-entering surface of the shielding member or the color of the colored material. In this way, in the presence of the ambient light, it is able to control the color reflected by the color reflection box through the control unit, thereby to enable the display panel to display an image. When the display panel is applied to the billboard, it is unnecessary to replace the poster on the billboard manually. In addition, the image is displayed by the display device by reflecting the ambient light. As compared with the conventional display device where the image is displayed by directly using the light from the light-emitting source, it is able to achieve a better visual effect during the daytime, and the stronger the ambient light is, the better the visual effect is.

DETAILED DESCRIPTION OF THE EMBODIMENTS

Figure 1:
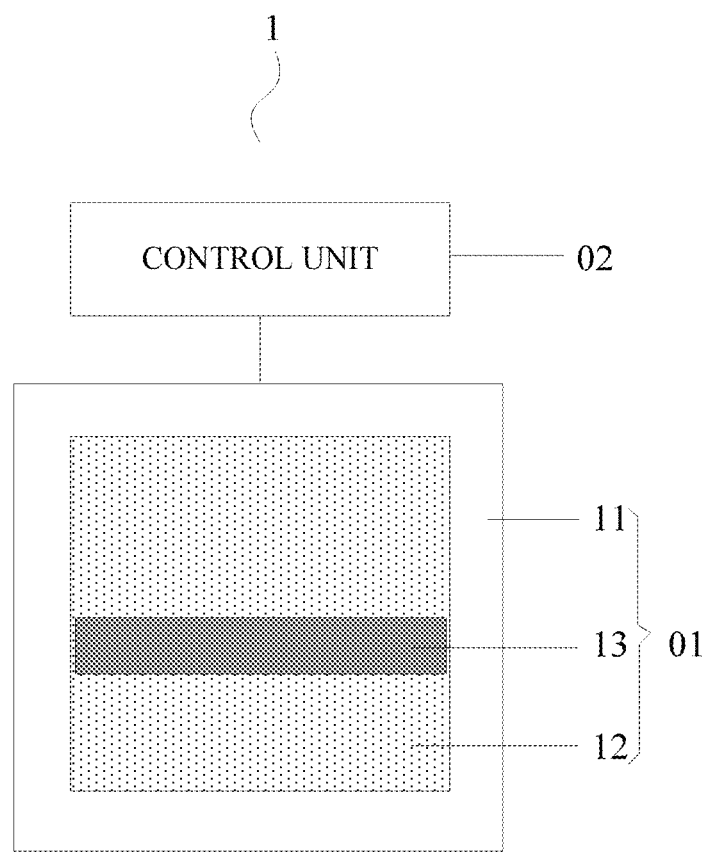
FIG. 1 is a schematic view showing a sub-pixel in a display panel according to one embodiment of the present disclosure.

The display panel, the display method and display device of the present disclosure will be described hereinafter in conjunction with the drawings and embodiments.

Shapes and sizes of the members in the drawings are for illustrative purposes only, but shall not be used to reflect any actual scale.

The present disclosure provides in some embodiments a display panel including a plurality of pixels, and each pixel includes at least one sub-pixel. As shown in FIG. 1, each sub-pixel 1 includes a color reflection box 01 and a control unit 02 configured to control a color to be displayed by the color reflection box 01.

The color reflection box 01 includes a case 11 defining a cavity, and a colored material 12 and a shielding member 13 sealed within the cavity. A light-entering surface of the case 11 is made of a transparent material, and a light-entering surface of the shielding member 13 is provided with a predetermined base color.

The control unit is configured to, in the presence of ambient light, control a position of the light-entering surface of the shielding member in the corresponding color reflection box relative to the light-entering surface of the cavity in accordance a display image at a corresponding position, so as to enable the color reflection box to display of the light-entering surface of the shielding member or a color of the colored material.

According to the embodiments of the present disclosure, in the presence of the ambient light, it is able to control the color reflected by the color reflection box through the control unit, thereby to enable the display panel to display an image. When the display panel is applied to the billboard, it is unnecessary to replace a poster manually. In addition, the image is displayed by the display device by reflecting the ambient light. As compared with the conventional display device where the image is displayed directly using the light from the light-emitting source, it is able to achieve a better outdoor visual effect during the daytime, and the stronger the ambient light is, the better the visual effect is.

During the implementation, the position of the light-entering surface of the shielding member in the color reflection box relative to the light-entering surface of the cavity is controlled so as to enable the color reflection box to display the color of the colored material or the color of the light-entering surface of the shielding member, thereby to enable the display panel to display the image, so each sub-pixel is of a relatively large area, and the display panel is particularly applicable to a large-scale billboard. This is because, the large-scale billboard is located at a position far away from a viewer, and a high resolution of the display panel might not be necessary. In addition, the large-scale billboard is usually provided outdoor, and sunlight may be directly used as the ambient light for the display panel.

Alternatively, in the above display panel, the predetermined base color of the light-entering surface of the shielding member is different from the color of the colored material.

Alternatively, in the above display panel, the colored material may be a colored fluid, such as a colored liquid or colloid, which is not particularly defined herein.

Alternatively, in the above display panel, the colored material may be colored ink.

Alternatively, in the above display panel, the plurality of pixels is arranged in a matrix form. Each pixel includes one or more sub-pixels, and the sub-pixels in an identical pixel are of different colors.

Alternatively, in the above display panel, in order to facilitate the manufacture and increase an active display area, the color reflection box is of a cuboidal or cubic shape, and the light-entering surface of the cavity of the color reflection box is of a rectangular or square shape, which is not particularly defined herein.

Alternatively, in the above display panel, when the color reflection box displays the color of the light-entering surface of the shielding member, the light-entering surface of the shielding member covers the colored material in the light-entering direction, and when the color reflection box displays the color of the colored material, the light-entering surface of the shielding member is immersed in the colored material.

Alternatively, in the above display panel, the shielding member includes at least one shielding plate which is rotatably and fixedly connected at one side to the light-entering surface of the case.

Figure 2A:
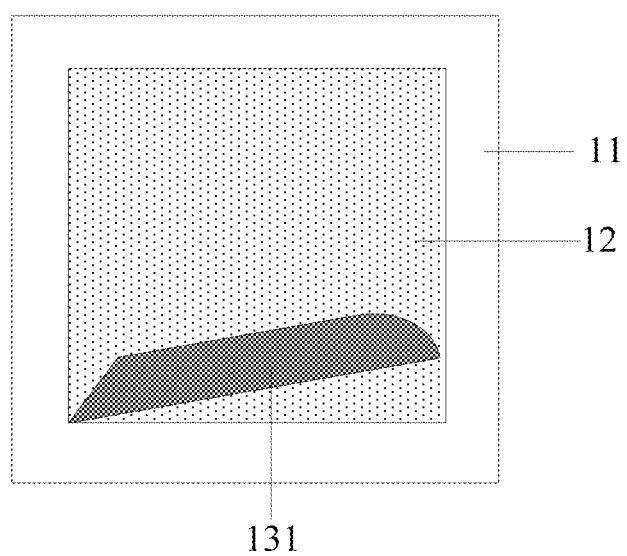
FIG. 2a is a schematic view showing a color reflection box according to one embodiment of the present disclosure.
Figure 2B:
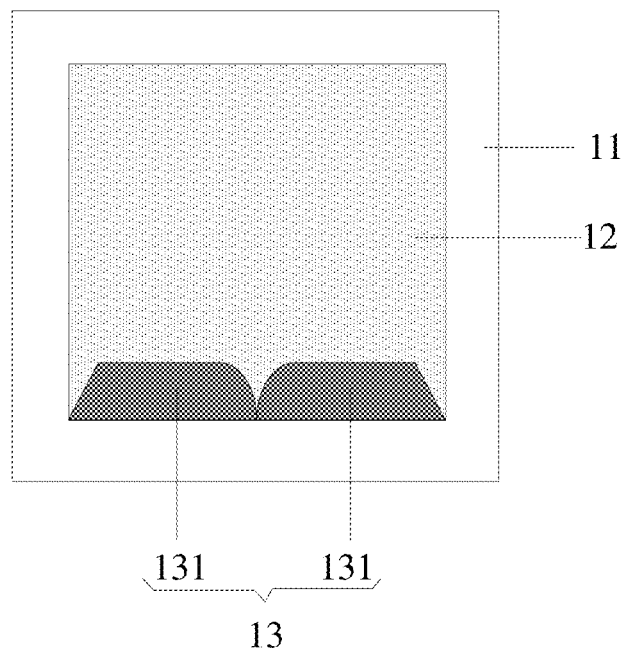
FIG. 2b is another schematic view showing the color reflection box according to one embodiment of the present disclosure.

For example, as shown in FIG. 2a, the shielding member 13 includes a shielding plate 131 which is rotatably and fixedly connected at one side to the light-entering surface of the case, or as shown in FIG. 2b, the shielding member 13 includes two shielding plates 131, each of which is rotatably and fixedly connected at one side to the light-entering surface of the case.

Figure 2C:
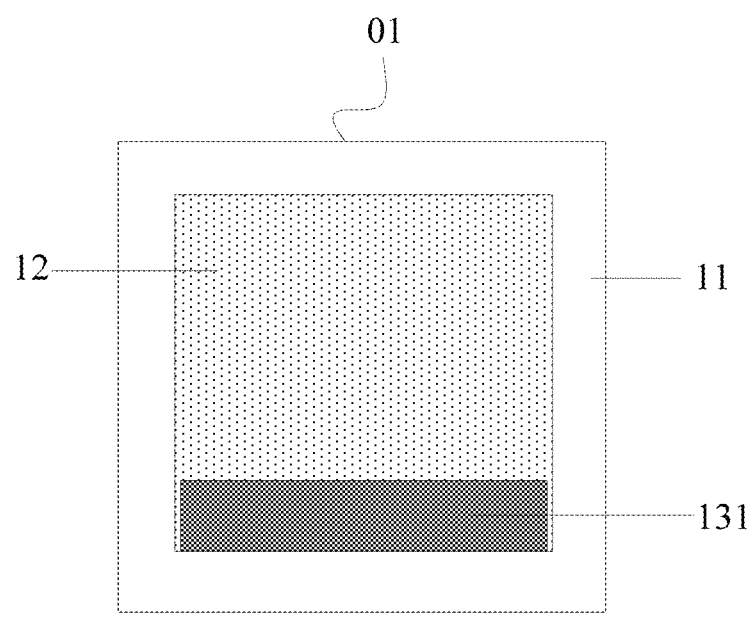
FIG. 2c is yet another schematic view showing the color reflection box according to one embodiment of the present disclosure.

Alternatively, in the above display panel, the shielding plate is connected to the case by a hinge. Alternatively, as shown in FIG. 2c, in the above display panel, the shielding member 13 includes a shielding plate 131 with a light-entering surface parallel to the light-entering surface of the cavity.

It should be appreciated that, in the above display panel, there is a gap between the shielding plate and the case, and when the shielding plate moves, the colored material may flow through the gap.

Figure 2D:
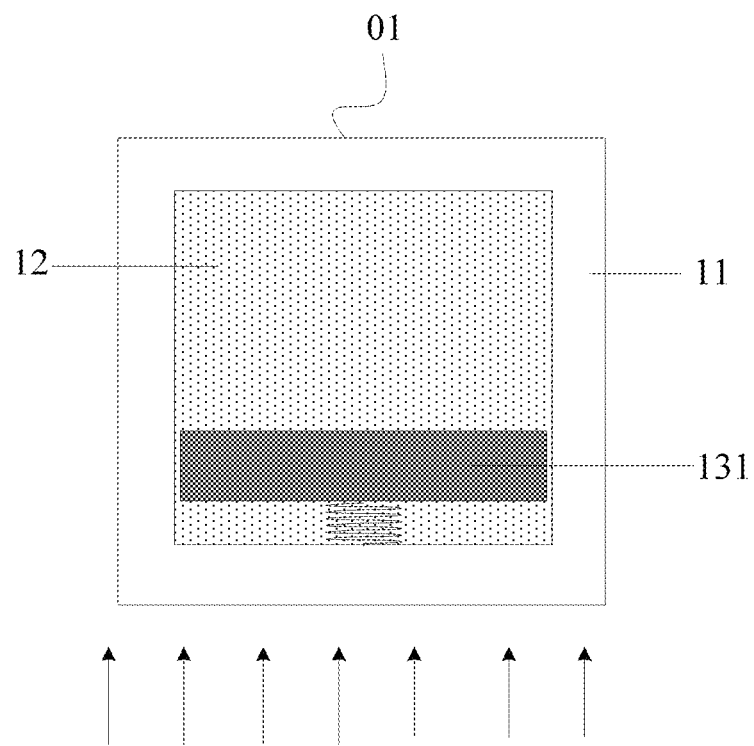
FIG. 2d is still yet another schematic view showing the color reflection box according to one embodiment of the present disclosure.

Alternatively, in the above display panel, in order to stabilize the shielding plate, as shown in FIG. 2d, a predetermined region on the light-entering surface of the shielding plate 131 is elastically connected to the light-entering surface of the case, and the light-entering surface of the shielding plate abuts against the light-entering surface of the cavity in a natural condition.

Alternatively, in the above display panel, the control unit is configured to, when it is determined that the corresponding color reflection box needs to display the color of the light-entering surface of the shielding member in accordance with the display image at the corresponding position, control the light-entering surface of the shielding member in the corresponding color reflection box to abut against the light-entering surface of the case, so as to enable the color reflection box to display the color of the light-entering surface of the shielding member, or when it is determined that the corresponding color reflection box needs to display the color of the colored material in accordance with the display image at the corresponding position, control the light-entering surface of the shielding member in the corresponding color reflection box to move away from the light-entering surface of the case, so as to enable the color reflection box to display the color of the colored material.

In this way, when it is determined that the color reflection box needs to display the color of the light-entering surface of the shielding member, the light-entering surface of the shielding member is controlled to abut against the light-entering surface of the case, so as to enable the colored material to move under the surface of the shielding member opposite to the light-entering surface, thereby to enable the color reflection box to display the color of the light-entering surface of the shielding member. When it is determined that the color reflection box needs to display the color of the colored material, the light-entering surface of the shielding member is controlled to move away from the light-entering surface of the case, so as to enable the colored material to fill into the gap between the light-entering surface of the shielding member and the light-entering surface of the case, thereby to enable the color reflection box to display the color of the colored material.

It should be appreciated that, in the above display panel, in order to enable the light-entering surface of the shielding member to move away from the light-entering surface of the cavity, the shielding member may be translated as a whole, or rotated with its edge as a rotational shaft, which is not particularly defined herein.

Alternatively, in the above display panel, the shielding plate includes a magnetic material.

Figure 2E:
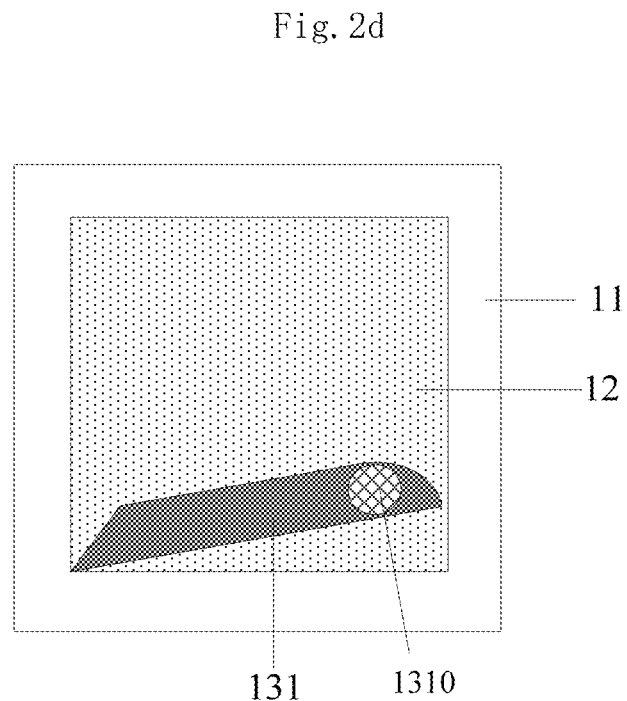
FIG. 2e is still yet another schematic view showing the color reflection box according to one embodiment of the present disclosure.
Figure 2F:
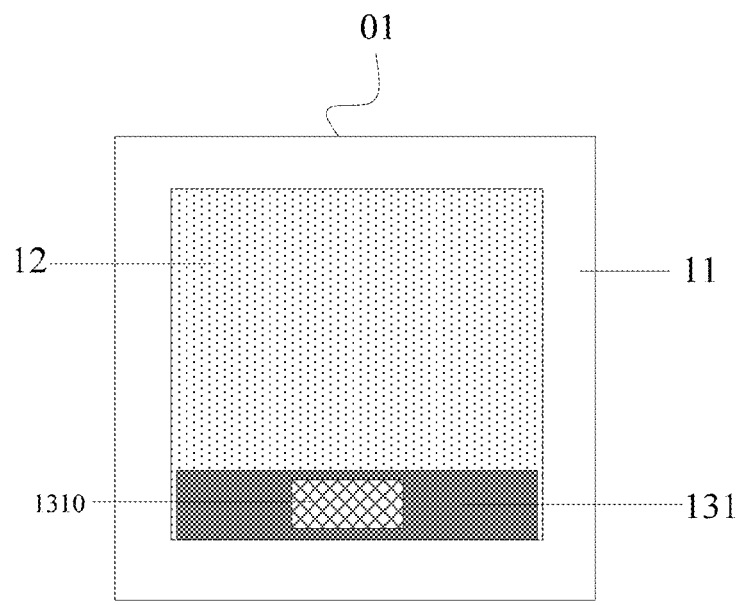
FIG. 2f is still yet another schematic view showing the color reflection box according to one embodiment of the present disclosure.

Alternatively, in the above display panel, the shielding plate may be made of a magnetic material, or a material doped with the magnetic material; or as shown in FIGS. 2e and 2f, a shaft 1310 made of the magnetic material is embedded into the shielding plate 131.

Alternatively, in the above display panel, the magnetic material may be Fe, Co or Ni, which is not particularly defined herein.

Because the shielding plate includes the magnetic material, the movement of the shielding plate may be controlled by an electromagnet.

The present disclosure will be further described hereinafter in conjunction with the embodiments. It should be appreciated that, the following embodiments are for illustrative purposes only, but shall not be used to limit the scope of the present disclosure.

First Embodiment

Figure 3A:
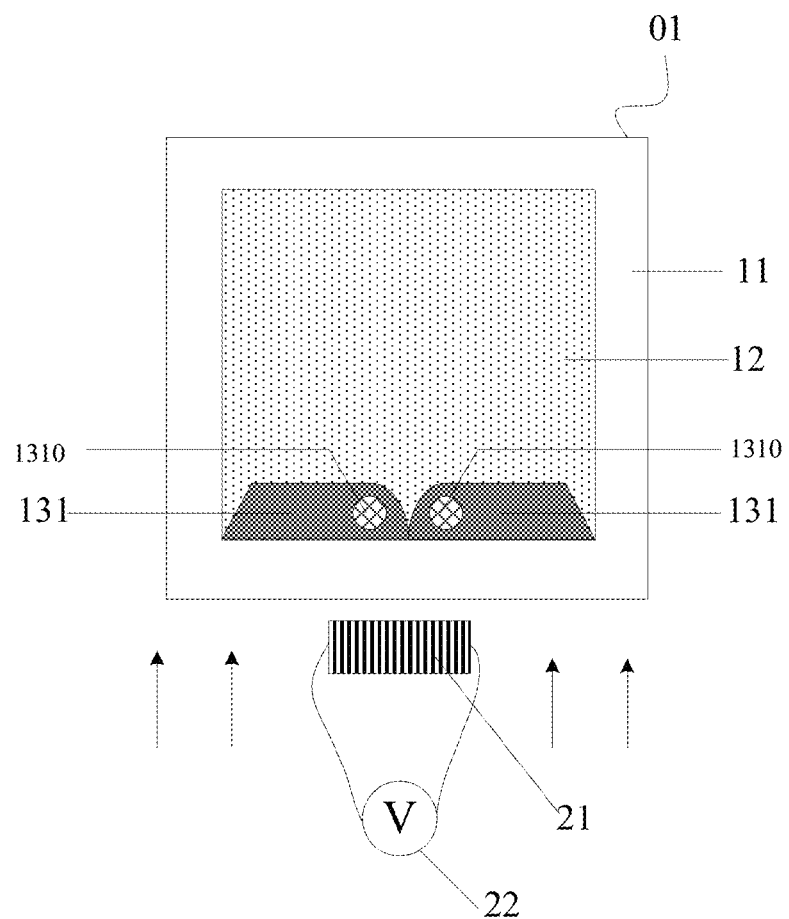
FIG. 3a is a schematic view showing a sub-pixel according to one embodiment of the present disclosure.
Figure 3B:
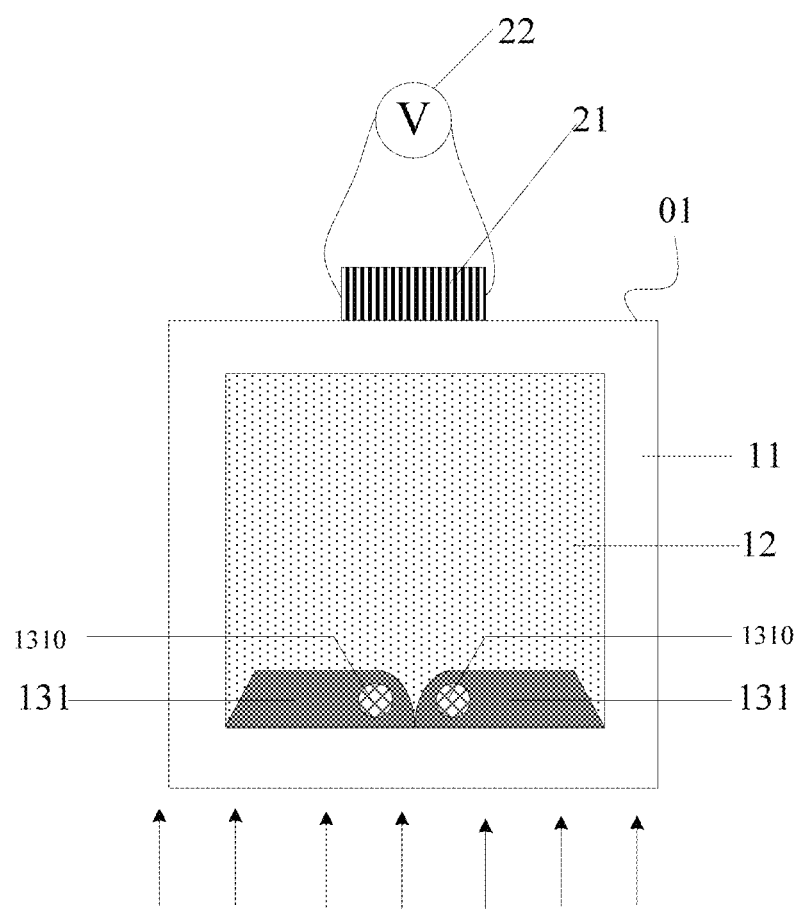
FIG. 3b is another schematic view showing the sub-pixel according to one embodiment of the present disclosure.
Figure 3C:
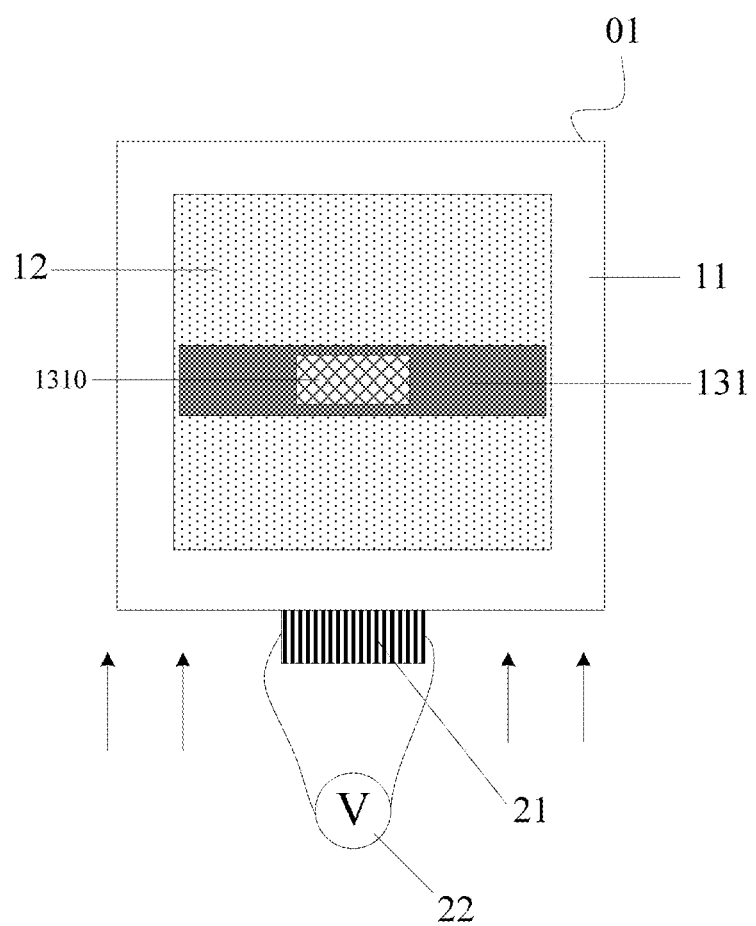
FIG. 3c is yet another schematic view showing the sub-pixel according to one embodiment of the present disclosure.
Figure 3D:
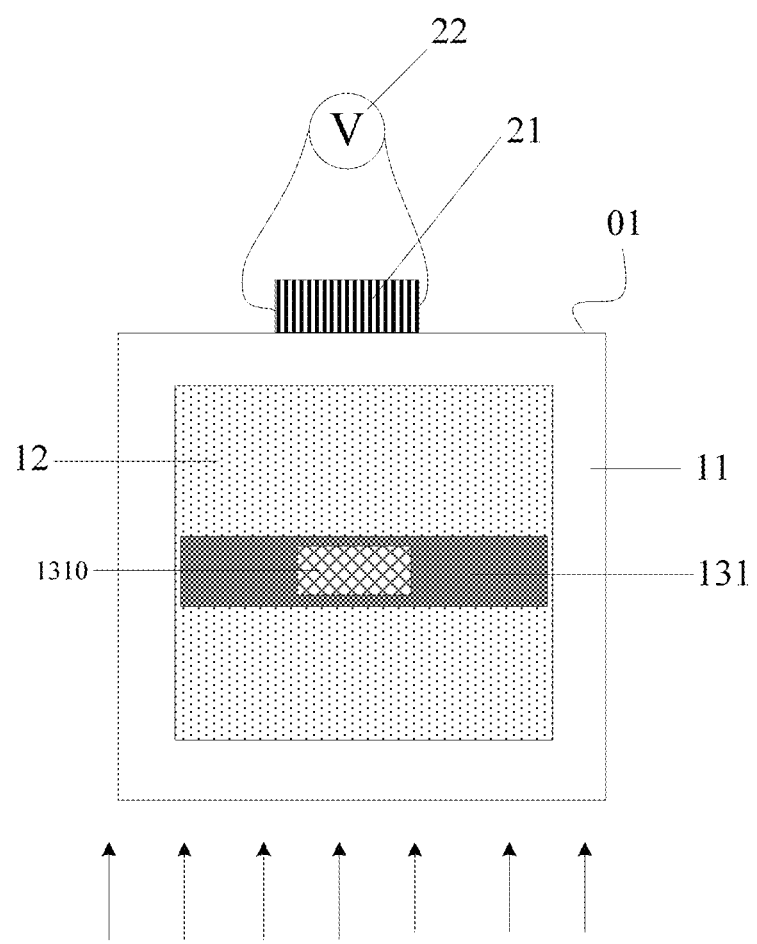
FIG. 3d is still yet another schematic view showing the sub-pixel according to one embodiment of the present disclosure.
Figure 3E:
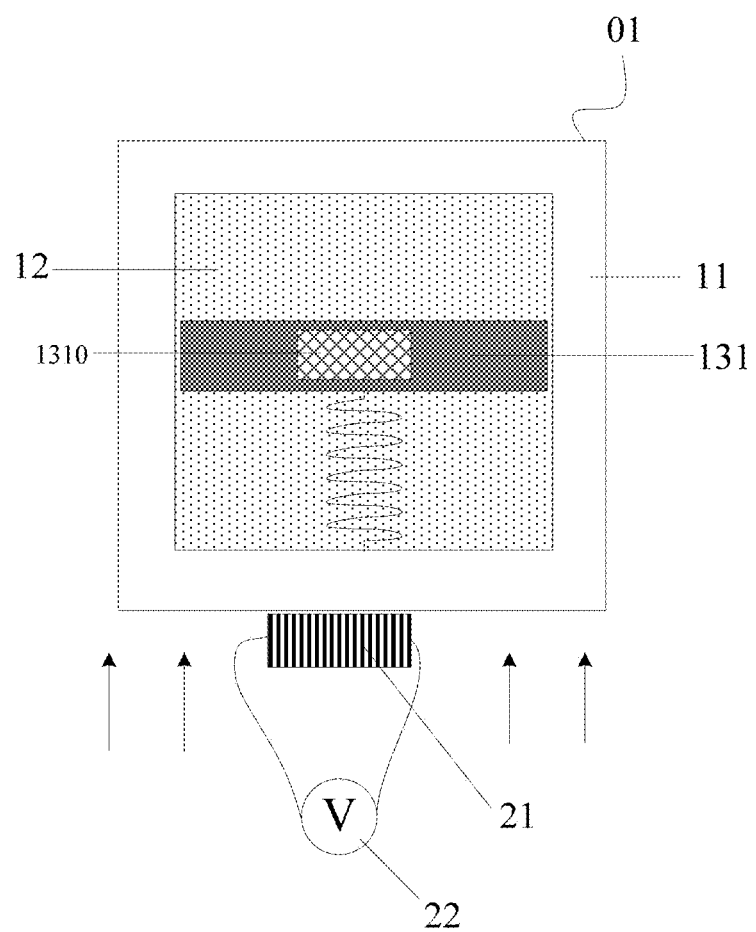
FIG. 3e is still yet another schematic view showing the sub-pixel according to one embodiment of the present disclosure.
Figure 3F:
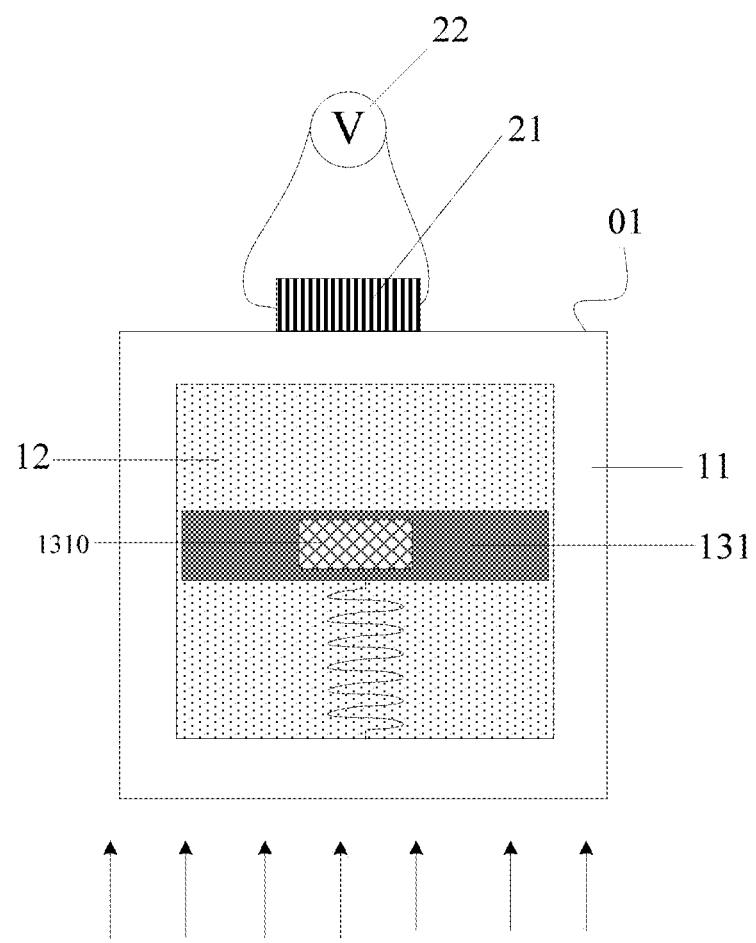
FIG. 3f is still yet another schematic view showing the sub-pixel according to one embodiment of the present disclosure.

Alternatively, in the above display panel, as shown in FIGS. 3a-3f, the control unit 02 includes a first electromagnet 21 and a first voltage application unit 22 configured to apply a voltage to the first electromagnet 21 in accordance with the display image at the corresponding position. As shown in FIGS. 3a, 3c and 3e, the first electromagnet 21 is located at a light-entering side of the color reflection box 01, or as shown in FIGS. 3b, 3d and 3f, the first electromagnet 21 is located at a side of the color reflection box 01 opposite to the light-entering side.

The first voltage application unit 22 is configured to, when it is determined that the color reflection box 01 needs to display the color of the light-entering surface of the shielding member 13 in accordance with the display image at the corresponding position, apply a first voltage to the first electromagnet 21, so as to enable the light-entering surface of the shielding member 13 to shield the colored material 12 in the light-entering direction under the control of the first electromagnet 21, and when it is determined that the color reflection box 01 needs to display the color of the colored material 12 in accordance with the display image at the corresponding position, apply a second voltage to the first electromagnet 21 so as to enable the light-entering surface of the shielding member 13 to be immersed in the colored material 12 under the control of the first electromagnet 21.

Alternatively, in the above display panel, as shown in FIGS. 3b, 3d and 3f, the first electromagnet 21 is located at the side of the color reflection box 01 opposite to the light-entering side, so as to prevent a display region from being occupied by the control unit.

During the implementation, the operation principle of the display panel may be described hereinafter in several circumstances depending on the structure of the shielding member.

In a first circumstance, the shielding plate of the shielding member is rotatably and fixedly connected to the case.

When the first electromagnet is located at the side of the color reflection box opposite to the light-entering side and it is determined that the color reflection box needs to display the color of the light-entering surface of the shielding member in accordance with the display image at the corresponding position, the first voltage is applied by the first voltage application unit to the first electromagnet, so as to generate a force by the first electromagnet to repel the magnetic material included in the shielding member, enable the shielding member to rotate toward the light-entering surface of the cavity and enable the light-entering surface of the shielding member to abut against the light-entering surface of the cavity, thereby to enable the light-entering surface of the shielding member to shield the colored material in the light-entering direction. When it is determined that the color reflection box needs to display the color of the colored material in accordance with the display image at the corresponding position, the second voltage is applied by the first voltage application unit to the first electromagnet, so as to generate a force by the first electromagnet to attract the magnetic material included in the shielding member, enable the shielding member to rotate toward the surface of the cavity opposite to the light-entering surface and enable the light-entering surface of the shielding member to move away from the light-entering surface of the cavity, thereby to enable the light-entering surface of the shielding member to be immersed in the colored material.

In contrast, when the first electromagnet is located at the light-entering side of the color reflection box and it is determined that the color reflection box needs to display the color of the light-entering surface of the shielding member in accordance with the display image at the corresponding position, the first voltage is applied by the first voltage unit to the first electromagnet, so as to generate a force by the first electromagnet to attract the magnetic material included in the shielding member, enable the shielding member to rotate toward the light-entering surface of the cavity and enable the light-entering surface of the shielding member to abut against the light-entering surface of the cavity, thereby to enable the light-entering surface of the shielding member to shield the colored material in the light-entering direction. When it is determined that the color reflection box needs to display the color of the colored material in accordance with the display image at the corresponding position, the second voltage is applied by the first voltage application unit to the first electromagnet, so as to generate a force by the first electromagnet to repel the magnetic material included in the shielding member, enable the shielding member to rotate toward the side of the cavity opposite to the light-entering surface, and enable the light-entering surface of the shielding member to move away from the light-entering surface of the cavity, thereby to enable the light-entering surface of the shielding member to be immersed in the colored material.

In a second circumstance, the shielding member is a shielding plate with its light-entering surface parallel to the light-entering surface of the cavity.

When the first electromagnet is located at the side of the color reflection box opposite to the light-entering side and it is determined that the color reflection box needs to display the color of the light-entering surface of the shielding member in accordance with the display image at the corresponding position, the first voltage is applied by the first voltage application unit to the first electromagnet, so as to generate a force by the first electromagnet to repel the magnetic material included in the shielding member, enable the shielding member to be translated toward the light-entering surface of the cavity and enable the light-entering surface of the shielding member to abut against the light-entering surface of the cavity, thereby to enable the light-entering surface of the shielding member to shield the colored material in the light-entering direction. When it is determined that the color reflection box needs to display the color of the colored material in accordance with the display image at the corresponding position, the second voltage is applied by the first voltage application unit to the first electromagnet, so as to generate a force by the first electromagnet to attract the magnetic material included in the shielding member, enable the shielding member to be translated toward the surface of the cavity opposite to the light-entering surface and enable the light-entering surface of the shielding member to move away from the light-entering surface of the cavity, thereby to enable the light-entering surface of the shielding member to be immersed in the colored material.

In contrast, when the first electromagnet is located at the light-entering side of the color reflection box and it is determined that the color reflection box needs to display the color of the light-entering surface of the shielding member in accordance with the display image at the corresponding position, the first voltage is applied by the first voltage unit to the first electromagnet, so as to generate a force by the first electromagnet to attract the magnetic material included in the shielding member, enable the shielding member to be translated toward the light-entering surface of the cavity and enable the light-entering surface of the shielding member to abut against the light-entering surface of the cavity, thereby to enable the light-entering surface of the shielding member to shield the colored material in the light-entering direction. When it is determined that the color reflection box needs to display the color of the colored material in accordance with the display image at the corresponding position, the second voltage is applied by the first voltage application unit to the first electromagnet, so as to generate a force by the first electromagnet to repel the magnetic material included in the shielding member, enable the shielding member to be translated toward the side of the cavity opposite to the light-entering surface, and enable the light-entering surface of the shielding member to move away from the light-entering surface of the cavity, thereby to enable the light-entering surface of the shielding member to be immersed in the colored material.

In a third circumstance, the shielding member is a shielding plate with its light-entering surface parallel to the light-entering surface of the cavity, a predetermined region on the light-entering surface of the shielding plate is elastically connected to the light-entering surface of the case, and the light-entering surface of the shielding plate abuts against the light-entering surface of the cavity in a natural condition.

When the first electromagnet is located at the side of the color reflection box opposite to the light-entering side and it is determined that the color reflection box needs to display the color of the light-entering surface of the shielding member in accordance with the display image at the corresponding position, the first voltage is applied by the first voltage application unit to the first electromagnet, and the first voltage is preferably 0V, so as to enable the shielding member to return to its natural condition and enable the light-entering surface of the shielding member to abut against the light-entering surface of the cavity, thereby to enable the light-entering surface of the shielding member to shield the colored material in the light-entering direction. When it is determined that the color reflection box needs to display the color of the colored material in accordance with the display image at the corresponding position, the second voltage is applied by the first voltage application unit to the first electromagnet, so as to generate a force by the first electromagnet to attract the magnetic material included in the shielding member, enable the shielding member to be translated toward the surface of the cavity opposite to the light-entering surface and enable the light-entering surface of the shielding member to move away from the light-entering surface of the cavity, thereby to enable the light-entering surface of the shielding member to be immersed in the colored material.

In contrast, when the first electromagnet is located at the light-entering side of the color reflection box and it is determined that the color reflection box needs to display the color of the light-entering surface of the shielding member in accordance with the display image at the corresponding position, the first voltage is applied by the first voltage application unit to the first electromagnet, and the first voltage is preferably 0V, so as to enable the shielding member to return to its natural condition and enable the light-entering surface of the shielding member to abut against the light-entering surface of the cavity, thereby to enable the light-entering surface of the shielding member to shield the colored material in the light-entering direction. When it is determined that the color reflection box needs to display the color of the colored material in accordance with the display image at the corresponding position, the second voltage is applied by the first voltage application unit to the first electromagnet, so as to generate a force by the first electromagnet to repel the magnetic material included in the shielding member, enable the shielding member to be translated toward the surface of the cavity opposite to the light-entering surface and enable the light-entering surface of the shielding member to move away from the light-entering surface of the cavity, thereby to enable the light-entering surface of the shielding member to be immersed in the colored material.

Alternatively, in the first and second circumstances, after the light-entering surface of the shielding member abuts against the light-entering surface of the cavity under the control of the first electromagnet, the first voltage application unit stops applying the voltage to the first electromagnet, and/or after the light-entering surface of the shielding member moves away from the light-entering surface of the cavity under the control of the first electromagnet, the first voltage application unit stops applying the voltage to the first electromagnet. In this way, the display panel is merely powered when the respective sub-pixel needs to change its color, so as to reduce the power consumption.

Second Embodiment

Figure 4A:
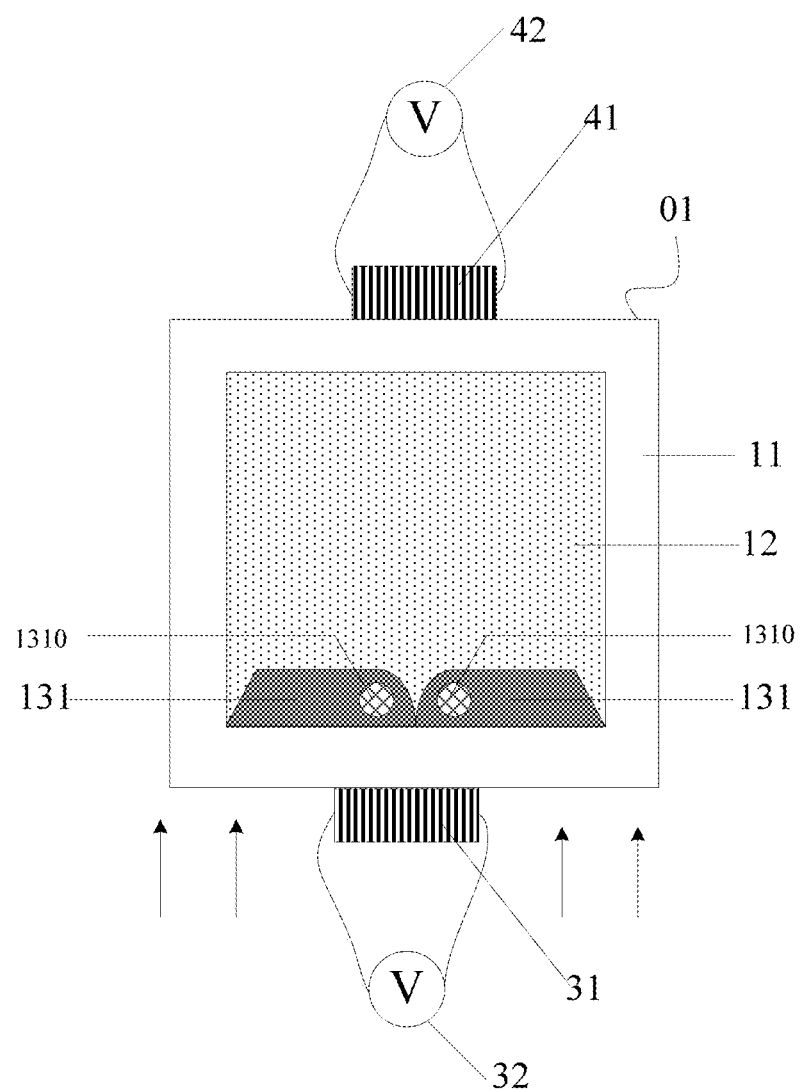
FIG. 4a is still yet another schematic view showing the sub-pixel according to one embodiment of the present disclosure.
Figure 4B:
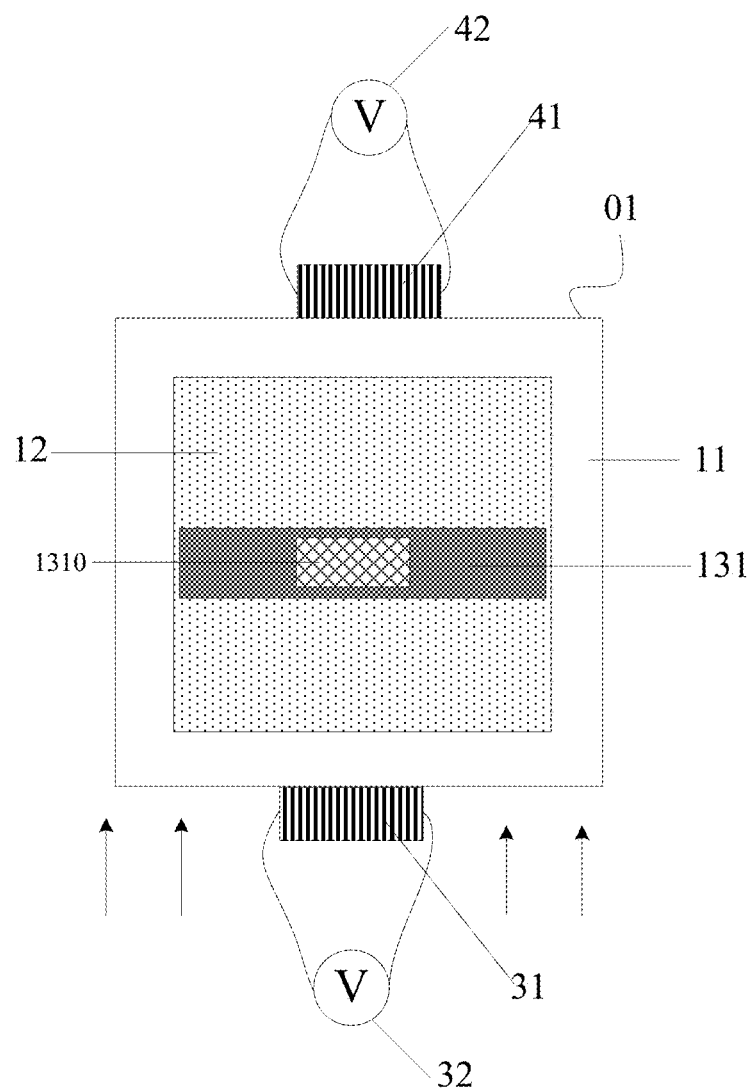
FIG. 4b is still yet another schematic view showing the sub-pixel according to one embodiment of the present disclosure.
Figure 4C:
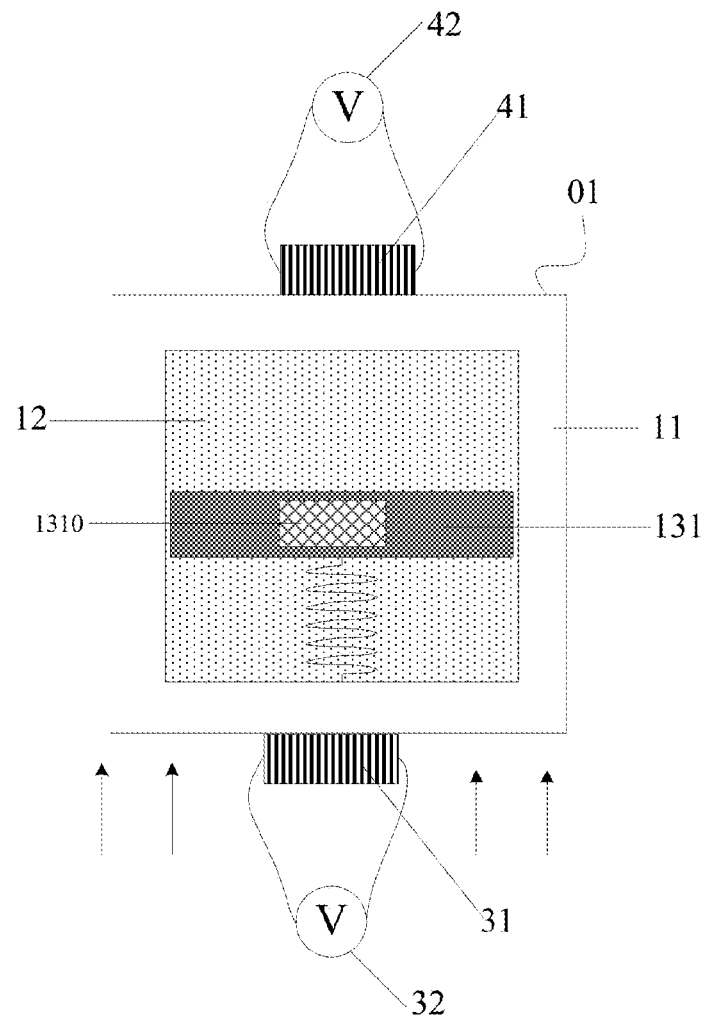
FIG. 4c is still yet another schematic view showing the sub-pixel according to one embodiment of the present disclosure.

Alternatively, in the above display panel, the control unit may include two magnets. To be specific, as shown in FIGS. 4a-4c, the control unit 02 includes a second electromagnet 31, a third electromagnet 41, a second voltage application unit 41 configured to apply a voltage to the second electromagnet 31 in accordance with a display image at a corresponding position, and a third voltage application unit 42 configured to apply a voltage to the third electromagnet 41 in accordance with a display image at a corresponding position.

The second electromagnet 31 is located at a light-entering side of the color reflection box 01 and the third electromagnet 41 is located at a side of the color reflection box 01 opposite to the light-entering side, or the second electromagnet 31 is located at the side of the color reflection box 01 opposite to the light-entering side and the third electromagnet 41 is located at the light-entering side. In FIGS. 4a-4c, the second electromagnet 31 is located at a light-entering side of the color reflection box 01 and the third electromagnet 41 is located at a side of the color reflection box 01 opposite to the light-entering side.

The second voltage application unit 32 is configured to, when it is determined that the color reflection box 01 needs to display the color of the light-entering surface of the shielding member 13 in accordance with the display image at the corresponding position, apply a voltage to the second electromagnet 31 so as to enable the light-entering surface of the shielding member 13 to shield the colored material 12 in the light-entering direction under the control of the second electromagnet 31.

The third voltage application unit 42 is configured to, when it is determined that the color reflection box 01 needs to display the color of the colored material 12 in accordance with the display image at the corresponding position, apply a voltage to the third electromagnet 41 so as to enable the light-entering surface of the shielding member 13 to be immersed in the colored material 12 under the control of the third electromagnet 41.

During the implementation, the operation principle of the display panel may be described hereinafter in several circumstances depending on the structure of the shielding member.

In a first circumstance, the shielding plate of the shielding member is rotatably and fixedly connected to the case.

When the second electromagnet is located at the light-entering side of the color reflection box, and the third electromagnet is located at the side of the color reflection box opposite to the light-entering side and it is determined that the color reflection box needs to display the color of the light-entering surface of the shielding member in accordance with the display image at the corresponding position, a voltage is applied by the second voltage application unit to the second electromagnet, so as to generate a force by the second electromagnet to attract the magnetic material included in the shielding member, enable the shielding member to rotate toward the light-entering surface of the cavity and enable the light-entering surface of the shielding member to abut against the light-entering surface of the cavity, thereby to enable the light-entering surface of the shielding member to shield the colored material in the light-entering direction. When it is determined that the color reflection box needs to display the color of the colored material in accordance with the display image at the corresponding position, the voltage is applied by the third voltage application unit to the third electromagnet, so as to generate a force by the third electromagnet to attract the magnetic material included in the shielding member, enable the shielding member to rotate toward the surface of the cavity opposite to the light-entering surface and enable the light-entering surface of the shielding member to move away from the light-entering surface of the cavity, thereby to enable the light-entering surface of the shielding member to be immersed in the colored material.

In contrast, when the second electromagnet is located at the side of the color reflection box opposite to the light-entering side, and the third electromagnet is located at the light-entering side of the color reflection box and it is determined that the color reflection box needs to display the color of the light-entering surface of the shielding member in accordance with the display image at the corresponding position, a voltage is applied by the second voltage application unit to the second electromagnet, so as to generate a force by the second electromagnet to repel the magnetic material included in the shielding member, enable the shielding member to rotate toward the light-entering surface of the cavity and enable the light-entering surface of the shielding member to abut against the light-entering surface of the cavity, thereby to enable the light-entering surface of the shielding member to shield the colored material in the light-entering direction. When it is determined that the color reflection box needs to display the color of the colored material in accordance with the display image at the corresponding position, the voltage is applied by the third voltage application unit to the third electromagnet, so as to generate a force by the third electromagnet to repel the magnetic material included in the shielding member, enable the shielding member to rotate toward the surface of the cavity opposite to the light-entering surface and enable the light-entering surface of the shielding member to move away from the light-entering surface of the cavity, thereby to enable the light-entering surface of the shielding member to be immersed in the colored material.

In a second circumstance, the shielding member is a shielding plate with its light-entering surface parallel to the light-entering surface of the cavity.

When the second electromagnet is located at the light-entering side of the color reflection box, and the third electromagnet is located at the side of the color reflection box opposite to the light-entering side and it is determined that the color reflection box needs to display the color of the light-entering surface of the shielding member in accordance with the display image at the corresponding position, a voltage is applied by the second voltage application unit to the second electromagnet, so as to generate a force by the second electromagnet to attract the magnetic material included in the shielding member, enable the shielding member to be translated toward the light-entering surface of the cavity and enable the light-entering surface of the shielding member to abut against the light-entering surface of the cavity, thereby to enable the light-entering surface of the shielding member to shield the colored material in the light-entering direction. When it is determined that the color reflection box needs to display the color of the colored material in accordance with the display image at the corresponding position, the voltage is applied by the third voltage application unit to the third electromagnet, so as to generate a force by the third electromagnet to repel the magnetic material included in the shielding member, enable the shielding member to be translated toward the surface of the cavity opposite to the light-entering surface and enable the light-entering surface of the shielding member to move away from the light-entering surface of the cavity, thereby to enable the light-entering surface of the shielding member to be immersed in the colored material.

In contrast, when the second electromagnet is located at the side of the color reflection box opposite to the light-entering side, and the third electromagnet is located at the light-entering side of the color reflection box and it is determined that the color reflection box needs to display the color of the light-entering surface of the shielding member in accordance with the display image at the corresponding position, a voltage is applied by the second voltage application unit to the second electromagnet, so as to generate a force by the second electromagnet to repel the magnetic material included in the shielding member, enable the shielding member to be translated toward the light-entering surface of the cavity and enable the light-entering surface of the shielding member to abut against the light-entering surface of the cavity, thereby to enable the light-entering surface of the shielding member to shield the colored material in the light-entering direction. When it is determined that the color reflection box needs to display the color of the colored material in accordance with the display image at the corresponding position, the voltage is applied by the third voltage application unit to the third electromagnet, so as to generate a force by the third electromagnet to repel the magnetic material included in the shielding member, enable the shielding member to be translated toward the surface of the cavity opposite to the light-entering surface and enable the light-entering surface of the shielding member to move away from the light-entering surface of the cavity, thereby to enable the light-entering surface of the shielding member to be immersed in the colored material.

In a third circumstance, the shielding member is a shielding plate with its light-entering surface parallel to the light-entering surface of the cavity, a predetermined region on the light-entering surface of the shielding plate is elastically connected to the light-entering surface of the cavity, and the light-entering surface of the shielding plate abuts against the light-entering surface of the cavity in a natural condition.

When the second electromagnet is located at the light-entering side of the color reflection box, and the third electromagnet is located at the side of the color reflection box opposite to the light-entering side and it is determined that the color reflection box needs to display the color of the light-entering surface of the shielding member in accordance with the display image at the corresponding position, a voltage is applied by the second voltage application unit to the second electromagnet, and the voltage is preferably 0V, so as to enable the shielding member to return to its natural condition and enable the light-entering surface of the shielding member to abut against the light-entering surface of the cavity, thereby to enable the light-entering surface of the shielding member to shield the colored material in the light-entering direction. When it is determined that the color reflection box needs to display the color of the colored material in accordance with the display image at the corresponding position, a voltage is applied by the third voltage application unit to the third electromagnet, so as to generate a force by the third electromagnet to attract the magnetic material included in the shielding member, enable the shielding member to be translated toward the surface of the cavity opposite to the light-entering surface and enable the light-entering surface of the shielding member to move away from the light-entering surface of the cavity, thereby to enable the light-entering surface of the shielding member to be immersed in the colored material.

In contrast, when the second electromagnet is located at the side of the color reflection box opposite to the light-entering side, and the third electromagnet is located at the light-entering side of the color reflection box and it is determined that the color reflection box needs to display the color of the light-entering surface of the shielding member in accordance with the display image at the corresponding position, a voltage is applied by the second voltage application unit to the second electromagnet, and the voltage is preferably 0V, so as to enable the shielding member to return to its natural condition and enable the light-entering surface of the shielding member to abut against the light-entering surface of the cavity, thereby to enable the light-entering surface of the shielding member to shield the colored material in the light-entering direction. When it is determined that the color reflection box needs to display the color of the colored material in accordance with the display image at the corresponding position, a voltage is applied by the third voltage application unit to the third electromagnet, so as to generate a force by the third electromagnet to repel the magnetic material included in the shielding member, enable the shielding member to be translated toward the surface of the cavity opposite to the light-entering surface and enable the light-entering surface of the shielding member to move away from the light-entering surface of the cavity, thereby to enable the light-entering surface of the shielding member to be immersed in the colored material.

Alternatively, in the first and second circumstances, after the light-entering surface of the shielding member abuts against the light-entering surface of the cavity under the control of the second electromagnet, the second voltage application unit stops applying the voltage to the second electromagnet, and/or after the light-entering surface of the shielding member moves away from the light-entering surface of the cavity under the control of the third electromagnet, the third voltage application unit stops applying the voltage to the third electromagnet. In this way, the display panel is merely powered when the respective sub-pixel needs to change its color, so as to reduce the power consumption.

Alternatively, in the above display panel, the second voltage application unit is further configured to, when it is determined that the color reflection box needs to display the color of the colored material in accordance with the display image at the corresponding position, apply the voltage to the second electromagnet, so as to enable the light-entering surface of the shielding member to be immersed in the colored material under the control of the second electromagnet, and the third voltage application unit further configured to, when it is determined that the color reflection box needs to display the color of the light-entering surface of the shielding member in accordance with the display image at the corresponding position, apply the voltage to the third electromagnet, so as to enable to the light-entering surface of the shielding member to shield the colored material in the light-entering direction under the control of the third electromagnet. In other words, the second voltage application unit may control the second electromagnet so as to enable the light-entering surface of the shielding member to abut against the light-entering surface of the cavity, or control the second electromagnet so as to enable the light-entering surface of the shielding member to move away from the light-entering surface of the cavity. Similarly, the third voltage application unit may control the third electromagnet so as to enable the light-entering surface of the shielding member to move away from the light-entering surface of the cavity, or control the third electromagnet so as to enable the light-entering surface of the shielding member to abut against the light-entering surface of the cavity. In this way, the movement of the shielding member is controlled by the two electromagnets, so as to enable the light-entering surface of the shielding member to abut against or move away from the light-entering surface of the cavity to the greatest extent, thereby to achieve an optimal display effect.

Figure 5:
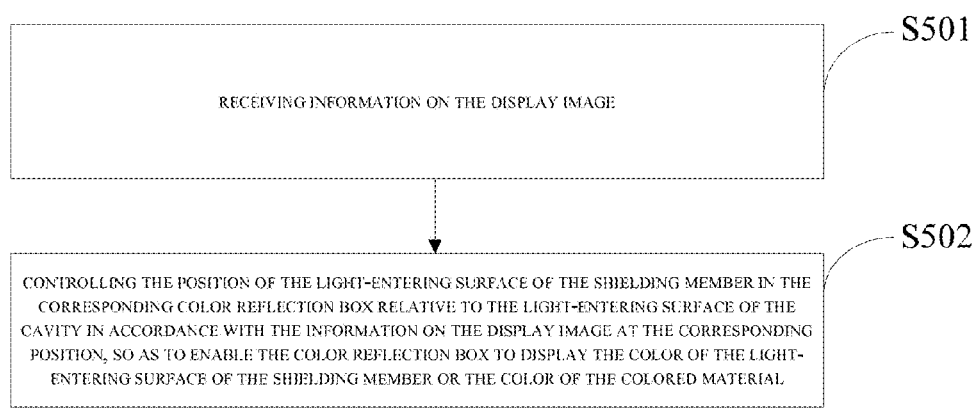
FIG. 5 is a flow chart of a display method for the display panel according to one embodiment of the present disclosure.

Based on a similar inventive concept, the present disclosure further provides in some embodiments a display method for the above-mentioned display panel, which, as shown in FIG. 5, includes a step S501 of receiving information on a display image, and a step S502 of controlling a position of the light-entering surface of the shielding member in corresponding color reflection box relative to the light-entering surface of the cavity in accordance with the information on the display image at the corresponding position, so as to enable the color reflection box to display the color of the light-entering surface of the shielding member or the color of the colored material.

Based on a similar inventive concept, the present disclosure provides in some embodiments a display device which includes the above-mentioned display panel. Since the inventive concepts are similar, the implementation of the display device may refer to the implementation of the display panel and thus will not be repeated herein.

According to the embodiments of the present disclosure, the display panel includes a plurality of pixels, and each pixel includes at least one sub-pixel. Each sub-pixel includes the color reflection box and the control unit configured to control the color to be displayed by the color reflection box. The color reflection box includes the case defining the cavity, and the color material and the shielding member sealed within the cavity. The light-entering surface of the cavity is made of a transparent material, and the light-entering surface of the shielding member is of the predetermined base color. The control unit is configured to, in the presence of the ambient light, control the position of the light-entering surface of the shielding member in the corresponding color reflection box relative to the light-entering surface of the cavity in accordance with the display image at the corresponding position, so as to enable the color reflection box to display the color of the light-entering surface of the shielding member or the color of the colored material. In this way, in the presence of the ambient light, it is able to control the color reflected by the color reflection box through the control unit, thereby to enable the display panel to display an image. When the display panel is applied to the billboard, it is unnecessary to replace the poster on the billboard manually. In addition, the image is displayed by the display device by reflecting the ambient light. As compared with the conventional display device where the image is displayed directly using the light from the light-emitting source, it is able to achieve a better outdoor visual effect during the daytime, and the stronger the ambient light is, the better the visual effect is.

The above are merely the preferred embodiments of the present disclosure. Obviously, a person skilled in the art may make further modification and improvements without departing from the principle of the present disclosure, and these modifications and improvements shall also fall within the scope of the present disclosure.

What is claimed is:

1. A display panel, comprising a plurality of pixels, wherein each of the pixels comprises at least one sub-pixel, each of the at least one sub-pixel comprises a color reflection box and a control unit configured to control a color to be displayed by the color reflection box,
    wherein the color reflection box comprises a case defining a cavity, and a colored material and a shielding member sealed within the cavity;
    a light-entering surface of the case is made of a transparent material, and a light-entering surface of the shielding member is of a predetermined base color; and
    the control unit is configured to, in a presence of ambient light, control a position of the light-entering surface of the shielding member in the corresponding color reflection box relative to a light-entering surface of the cavity in accordance with a display image at a corresponding position, so as to enable the color reflection box to display the color of the light-entering surface of the shielding member or a color of the colored material.

2. The display panel according to claim 1, wherein when the colored material is shielded by the light-entering surface of the shielding member in a light-entering direction, the color reflection box displays the color of the light-entering surface of the shielding member, and when the light-entering surface of the shielding member is immersed in the colored material, the color reflection box displays the color of the colored material.

3. The display panel according to claim 2, wherein the shielding member comprises at least one shielding plate, and the shielding plate is rotatably and fixedly connected at one side to the light-entering surface of the case.

4. The display panel according to claim 2, wherein the shielding member is a shielding plate with a light-entering surface parallel to the light-entering surface of the cavity.

5. The display panel according to claim 2, wherein the colored material is colored ink.

6. The display panel according to claim 1, wherein the shielding member comprises at least one shielding plate, and the shielding plate is rotatably and fixedly connected at one side to the light-entering surface of the case.

7. The display panel according to claim 6, wherein the shielding plate is connected to the case via a hinge.

8. The display panel according to claim 7, wherein the control unit is configured to,
    when it is determined that the corresponding color reflection box needs to display the color of the light-entering surface of the shielding member in accordance with the display image at the corresponding position, control the light-entering surface of the shielding member in the corresponding color reflection box to abut against the light-entering surface of the cavity, so as to enable the color reflection box to display the color of the light-entering surface of the shielding member; or
    when it is determined that the corresponding color reflection box needs to display the color of the colored material in accordance with the display image at the corresponding position, control the light-entering surface of the shielding member in the corresponding color reflection box to move away from the light-entering surface of the cavity, so as to enable the color reflection box to display the color of the colored material.

9. The display panel according to claim 6, wherein the control unit is configured to,
    when it is determined that the corresponding color reflection box needs to display the color of the light-entering surface of the shielding member in accordance with the display image at the corresponding position, control the light-entering surface of the shielding member in the corresponding color reflection box to abut against the light-entering surface of the cavity, so as to enable the color reflection box to display the color of the light-entering surface of the shielding member; or
    when it is determined that the corresponding color reflection box needs to display the color of the colored material in accordance with the display image at the corresponding position, control the light-entering surface of the shielding member in the corresponding color reflection box to move away from the light-entering surface of the cavity, so as to enable the color reflection box to display the color of the colored material.

10. The display panel according to claim 9, wherein the shielding plate comprises a magnetic material.

11. The display panel according to claim 10, wherein the control unit comprises a first electromagnet and a first voltage application unit configured to apply a voltage to the first electromagnet in accordance with the display image at the corresponding position, wherein the first electromagnet is located at a light-entering side of the color reflection box or a side of the color reflection box opposite to the light-entering side; and the first voltage application unit is configured to, when it is determined that the color reflection box needs to display the color of the light-entering surface of the shielding member in accordance with the display image at the corresponding position, apply a first voltage to the first electromagnet, so as to enable the light-entering surface of the shielding member to shield the colored material in the light-entering direction under the control of the first electromagnet; and when it is determined that the color reflection box needs to display the color of the colored material in accordance with the display image at the corresponding position, apply a second voltage to the first electromagnet so as to enable the light-entering surface of the shielding member to be immersed in the colored material under the control of the first electromagnet.

12. The display panel according to claim 10, wherein the control unit comprises a second electromagnet, a third electromagnet, a second voltage application unit configured to apply a voltage to the second electromagnet in accordance with the display image at the corresponding position, and a third voltage application unit configured to apply a voltage to the third electromagnet in accordance with the display image at the corresponding position, wherein the second electromagnet is located at the light-entering side of the color reflection box and the third electromagnet is located at the side of the color reflection box opposite to the light-entering side, or the second electromagnet is located at the side of the color reflection box opposite to the light-entering side and the third electromagnet is located at the light-entering side of the color reflection box;

the second voltage application unit is configured to, when it is determined that the color reflection box needs to display the color of the light-entering surface of the shielding member in accordance with the display image at the corresponding position, apply a voltage to the second electromagnet so as to enable the shielding member to shield the colored material in the light-entering direction under the control of the second electromagnet; and the third voltage application unit is configured to, when it is determined that the color reflection box needs to display the color of the colored material in accordance with the display image at the corresponding position, apply a voltage to the third electromagnet so as to enable the light-entering surface of the shielding member to be immersed in the colored material under the control of the third electromagnet.

13. The display panel according to claim 1, wherein the shielding member is a shielding plate with a light-entering surface parallel to the light-entering surface of the cavity.

14. The display panel according to claim 13, wherein the shielding plate is elastically connected to the light-entering surface of the case by a predetermined region on the light-entering surface of the shielding plate, and the light-entering surface of the shielding plate tightly abuts against the light-entering surface of the cavity in a natural condition.

15. The display panel according to claim 14, wherein the control unit is configured to, when it is determined that the corresponding color reflection box needs to display the color of the light-entering surface of the shielding member in accordance with the display image at the corresponding position, control the light-entering surface of the shielding member in the corresponding color reflection box to abut against the light-entering surface of the cavity, so as to enable the color reflection box to display the color of the light-entering surface of the shielding member; or when it is determined that the corresponding color reflection box needs to display the color of the colored material in accordance with the display image at the corresponding position, control the light-entering surface of the shielding member in the corresponding color reflection box to move away from the light-entering surface of the cavity, so as to enable the color reflection box to display the color of the colored material.

16. The display panel according to claim 13, wherein the control unit is configured to, when it is determined that the corresponding color reflection box needs to display the color of the light-entering surface of the shielding member in accordance with the display image at the corresponding position, control the light-entering surface of the shielding member in the corresponding color reflection box to abut against the light-entering surface of the cavity, so as to enable the color reflection box to display the color of the light-entering surface of the shielding member; or when it is determined that the corresponding color reflection box needs to display the color of the colored material in accordance with the display image at the corresponding position, control the light-entering surface of the shielding member in the corresponding color reflection box to move away from the light-entering surface of the cavity, so as to enable the color reflection box to display the color of the colored material.

17. The display panel according to claim 1, wherein the colored material is colored ink.

18. The display panel according to claim 1, wherein the color reflection box is of a cuboidal or cubic shape, and the light-entering surface of the cavity of the color reflection box is of a rectangular or square shape.

19. A display method for the display panel according to claim 1, comprising steps of:

receiving information on the display image; and controlling the position of the light-entering surface of the shielding member in the corresponding color reflection box relative to the light-entering surface of the cavity in accordance with the information on the display image at the corresponding position, so as to enable the color reflection box to display the color of the light-entering surface of the shielding member or the color of the colored material.

20. A display device comprising the display panel according to claim 1.

* * * * *